US012797652B2

(12) United States Patent
Poppenberg

(10) Patent No.: US 12,797,652 B2
(45) Date of Patent: Nov. 17, 2026

(54) LOCKING MANIFOLD FOR CHEMICAL OXYGEN GENERATOR

(71) Applicant: AVOX Systems Inc., Lancaster, NY (US)

(72) Inventor: Thomas Poppenberg, Holland, NY (US)

(73) Assignee: AVOX Systems Inc., Lancaster, NY (US)

(*) Notice: Subject to any disclaimer, the term of this patent is extended or adjusted under 35 U.S.C. 154(b) by 1395 days.

(21) Appl. No.: 17/297,671

(22) PCT Filed: Dec. 3, 2019

(86) PCT No.: PCT/US2019/064331
§ 371 (c)(1),
(2) Date: May 27, 2021

(87) PCT Pub. No.: WO2020/117871
PCT Pub. Date: Jun. 11, 2020

(65) Prior Publication Data

US 2022/0040509 A1 Feb. 10, 2022

Related U.S. Application Data

(60) Provisional application No. 62/774,836, filed on Dec. 3, 2018.

(51) Int. Cl.
*A62B 21/00* (2006.01)
*A62B 25/00* (2006.01)

(52) U.S. Cl.
CPC ............ *A62B 21/00* (2013.01); *A62B 25/005* (2013.01)

(58) Field of Classification Search
CPC .. A62B 7/08; A62B 9/02; A62B 21/00; A62B 25/005
See application file for complete search history.

(56) References Cited

U.S. PATENT DOCUMENTS 5,268,021 A 12/1993 Hill et al.
5,709,252 A * 1/1998 Princiotta ............ F17C 13/084 108/55.3

(Continued)

FOREIGN PATENT DOCUMENTS

EP 0736486 10/1996
GB 891392 3/1962
WO 2012160477 11/2012

OTHER PUBLICATIONS

European Application No. 19892035.7, Extended European Search Report mailed on Jul. 8, 2022, 8 pages.

(Continued)

*Primary Examiner* — Valerie L Woodward
(74) *Attorney, Agent, or Firm* — Kilpatrick Townsend & Stockton LLP

(57) ABSTRACT

A manifold for a chemical oxygen generator (COG) includes a locating plate configured to interface with a COG and a plenum body rotatably attached to the locking plate. The plenum body has an inlet for receiving oxygen and at least one output port in pneumatic communication with the inlet. The manifold includes a lock for immobilizing the plenum body with respect to the locating plate in at least a first position. In another aspect, a COG is provided. The COG may have a housing and a locking manifold.

19 Claims, 5 Drawing Sheets

(56) References Cited

U.S. PATENT DOCUMENTS

| | | | | |
|---|---|---|---|---|
| 5,725,834 | A * | 3/1998 | Nishii | C01B 13/0296 422/126 |
| 6,336,667 | B1 | 1/2002 | Ford et al. | |
| 9,371,921 | B2 | 6/2016 | Whitaker | |
| 9,481,477 | B2 | 11/2016 | Kjar | |
| 2003/0131850 | A1 | 7/2003 | Pietrantoni | |
| 2003/0154982 | A1 | 8/2003 | Tokasz et al. | |
| 2010/0319796 | A1 | 12/2010 | Whitaker | |
| 2012/0031391 | A1 | 2/2012 | Albizuri | |
| 2015/0104355 | A1* | 4/2015 | Mack, Jr. | C01B 13/0218 422/126 |
| 2017/0065447 | A1 | 3/2017 | Whitaker et al. | |
| 2017/0342364 | A1 | 11/2017 | Grosch et al. | |
| 2021/0069532 | A1* | 3/2021 | Jason | A62B 7/14 |

OTHER PUBLICATIONS

International Application No. PCT/US2019/064331, International Preliminary Report on Patentability mailed on Jun. 17, 2021, 8 pages.
European Application No. 19892035.7, Intention to Grant mailed on Feb. 9, 2024, 8 pages.
International Application No. PCT/US2019/064331, International Search Report and Written Opinion mailed Feb. 20, 2020, 10 pages.

* cited by examiner

LOCKING MANIFOLD FOR CHEMICAL OXYGEN GENERATOR

CROSS-REFERENCE TO RELATED APPLICATIONS

This application is a national stage application of International Patent Application No. PCT/US2019/064331, filed on Dec. 3, 2019 and entitled LOCKING MANIFOLD FOR CHEMICAL OXYGEN GENERATOR, which claims priority to U.S. Provisional Application No. 62/774,836, filed on Dec. 3, 2018, both of which are hereby incorporated by reference in their entireties.

FIELD OF THE DISCLOSURE

The present disclosure relates to chemical oxygen generators and, more particularly, to manifolds for chemical oxygen generators.

BACKGROUND OF THE DISCLOSURE

Currently, chemical oxygen generators (COGs) for aircraft may be configured such that a manifold component is able to rotate freely (rotation relative to a housing of the COG). In some aircraft, it is preferable for the COGs to have manifolds that are fixed in position rather than rotatable. However, such fixed manifolds may require the use of two or more COG configurations. For example, some aircraft may require COGs configured for installation in a left side of the aircraft and differently-configured COGs for installation in a right side of the aircraft. The requirement for differently-configured COGs creates complexity in that multiple COG configurations must be manufactured and maintained.

BRIEF SUMMARY OF THE DISCLOSURE

The present disclosure may be embodied as a manifold for a chemical oxygen generator (COG). The manifold includes a locating plate configured to interface with the COG. A plenum body is rotatably attached to the locating plate. The plenum body has an inlet configured to pneumatically couple to an oxygen output of the COG. At least one output port of the plenum body is in pneumatic communication with the inlet. In some embodiments, the plenum body includes two or more output ports in pneumatic communication with the inlet. The manifold includes a lock for immobilizing the plenum body with respect to the locating plate in at least a first position.

The lock may be, for example, a pin. For example, the pin may be a spring-biased pin configured such that the pin is biased to remain in a locked position once locked. The pin may be located in the plenum body and configured to cooperate with the locating plate to immobilize the plenum body with respect to the locating plate. For example, the pin may cooperate with a notch, hole, indentation, or other feature of the locating plate. In other embodiments, the pin may be a part of the locating plate and configured to cooperate with the manifold to immobilize the components. The lock may be configured to irreversibly immobilize the plenum body with respect to the locating plate. In this way, once a COG is configured in a desired arrangement, the COG cannot be reconfigured. In other embodiments, the lock is reversible such that the COG may be reconfigured. The lock may be configured to immobilize the plenum body in at least one additional position relative to the locating plate. In this way, for example, a COG may be configured for installation in a left side of an aircraft or a right side of an aircraft.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
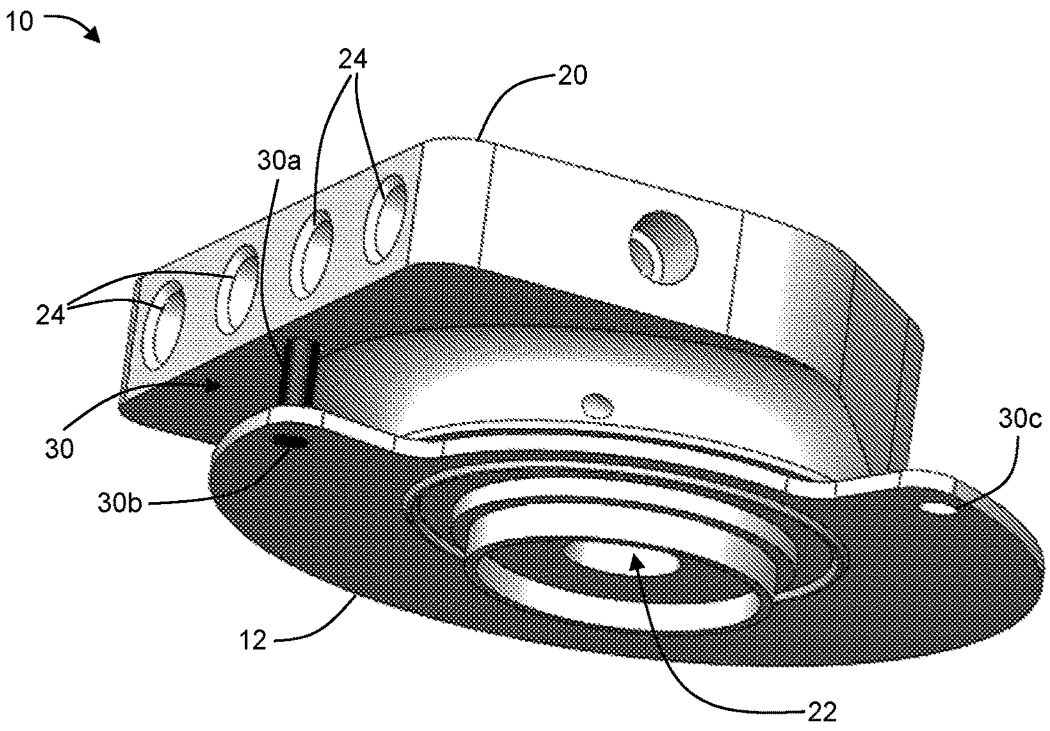
FIG. 1 is a perspective view of a device according to another embodiment of the present disclosure, wherein a pin is located at a front side of a manifold.

With reference to FIG. 1, the present disclosure may be embodied as a manifold 10 for a chemical oxygen generator (COG). The manifold 10 includes a locating plate 12 configured to interface with the COG, for example, with a housing of a COG. A plenum body 20 is rotatably attached to the locating plate 12 (sometimes referred to as a "spud"). The plenum body 20 has an inlet 22 for receiving oxygen from the COG. For example, the inlet may be configured to pneumatically couple to an oxygen output of the COG (e.g., COG output mounting stud). At least one output port 24 of the plenum body 20 is in pneumatic communication with the inlet 22. In some embodiments, the plenum body 20 includes two or more output ports 24 in pneumatic communication with the inlet 22.

The manifold 10 includes a lock 30 for immobilizing the plenum body 20 with respect to the locating plate 12 in at least a first position. The lock may have an initial (i.e., unlocked) state, and a locked state. While in the unlocked state, the plenum body 20 is rotatable on the locking plate. In the locked state, the plenum body is immobilized with respect to the locking plate. The lock may be configured to automatically move from the unlocked state to the locked state when the plenum body is rotated to a desired position (orientation) on the locking plate. The lock may be, for example, a pin, a latch, a tab, a stud, a clip, etc. In the embodiment depicted in FIG. 1, the lock 30 is a pin 30*a*. The pin 30*a* may be a spring-biased pin configured such that the pin is biased to remain in a locked position once locked (further described below). The pin 30*a* may be located in the plenum body 20 and configured to cooperate with the locating plate 12 to immobilize the plenum body 20 with respect to the locating plate 12. For example, the pin 30*a* may cooperate with a receiver of the locating plate. The receiver may be a notch, a hole, an indentation, a slot, or other feature or features of the locating plate. FIG. 1 depicts an embodiment having a hole 30*b* which cooperates with pin 30*a*. In other embodiments, the pin may be a part of the locating plate and configured to cooperate with the manifold to immobilize the components. The lock 30 may be configured to irreversibly immobilize the plenum body 20 with respect to the locating plate 12. In this way, once a COG (complete COG including the presently-disclosed manifold) is configured in a desired arrangement, the COG cannot be reconfigured. In other embodiments, the lock 30 is reversible such that the COG may be reconfigured. The lock 30 may be configured to immobilize the plenum body 20 in at least one additional position relative to the locating plate (see second hole 30*c* in FIG. 1). In this way, for example, a COG may be configured for installation in a left side of an aircraft or a right side of an aircraft.

Figure 2:
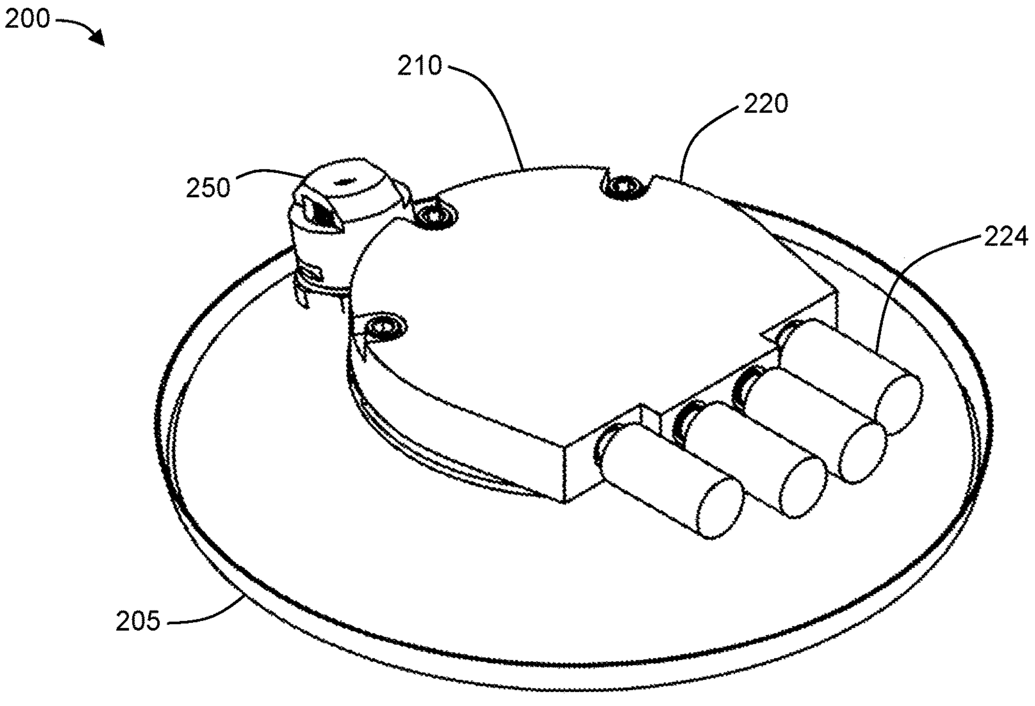
FIG. 2 is a is a perspective view of a device according to another embodiment of the present disclosure.
Figure 3A:
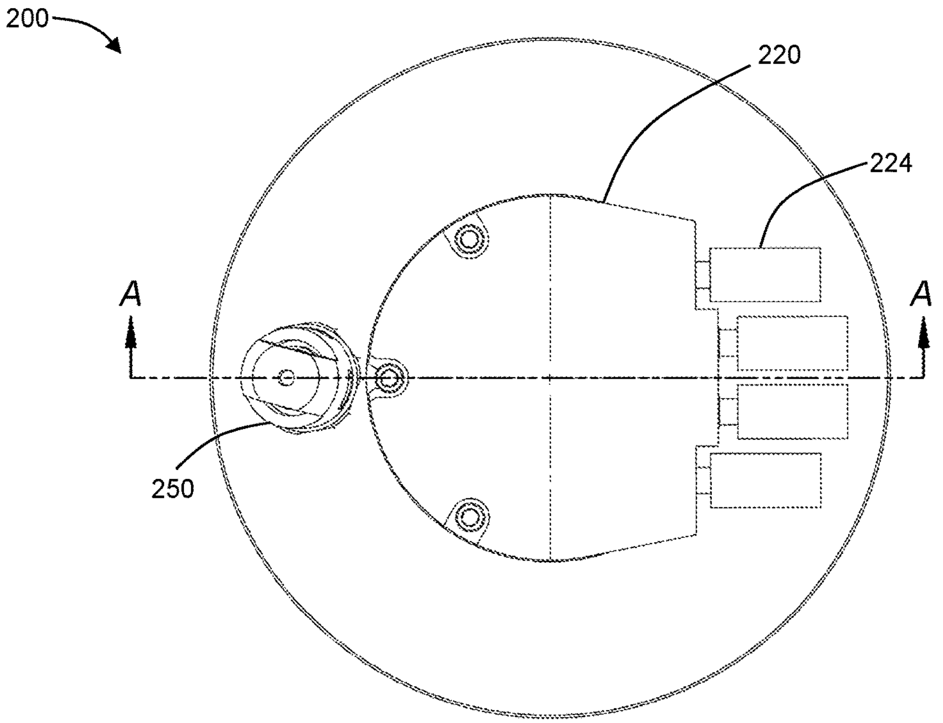
FIG. 3A is a top view of the device of FIG. 2.
Figure 3B:
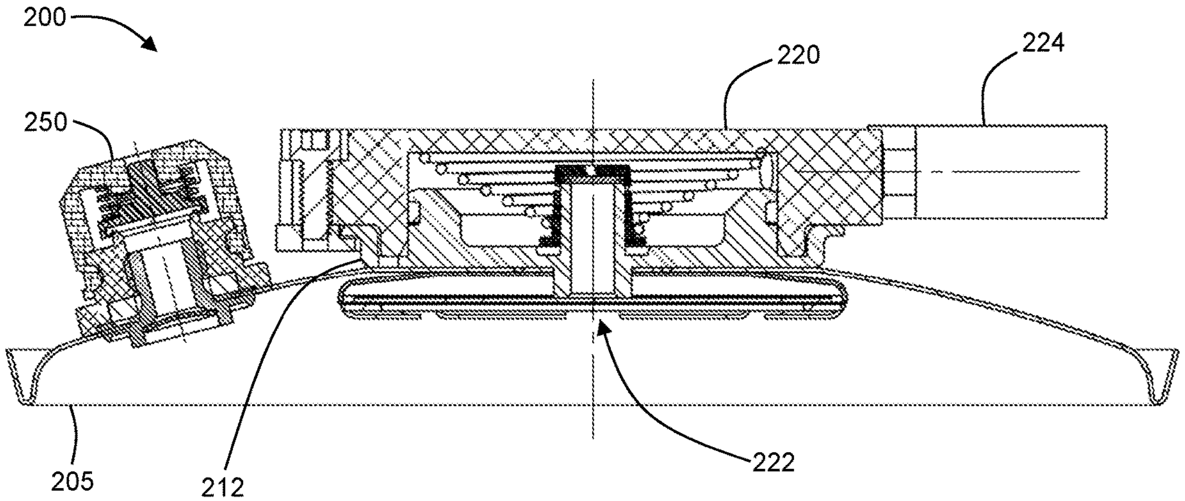
FIG. 3B is a cross-sectional side view of the device of FIGS. 2 and 3A, taken along A-A of FIG. 3A.

FIGS. 2, 3A, and 3B show another embodiment of a head assembly 200 for a COG, the head assembly 200 including a manifold 210. The manifold 210 includes a locating plate 212 configured to interface with the COG. For example, the head assembly 200 may include a cap 205, which may form a portion of a COG housing, and the locking plate 212 may be attached to the cap 205. A plenum body 220 is rotatably attached to the locating plate 212. The plenum body 220 has an inlet 222 configured to receive oxygen from the COG, for example, from an interior portion of a housing of the COG. At least one output port 224 of the plenum body 220 is in pneumatic communication with the inlet 222. In some embodiments, the plenum body 220 includes two or more output ports 224 in pneumatic communication with the inlet 222. For example, the embodiment depicted in FIG. 2 has four output ports. Some embodiments of a head assembly 200 may also include a pressure relief valve 250.

Figure 4:
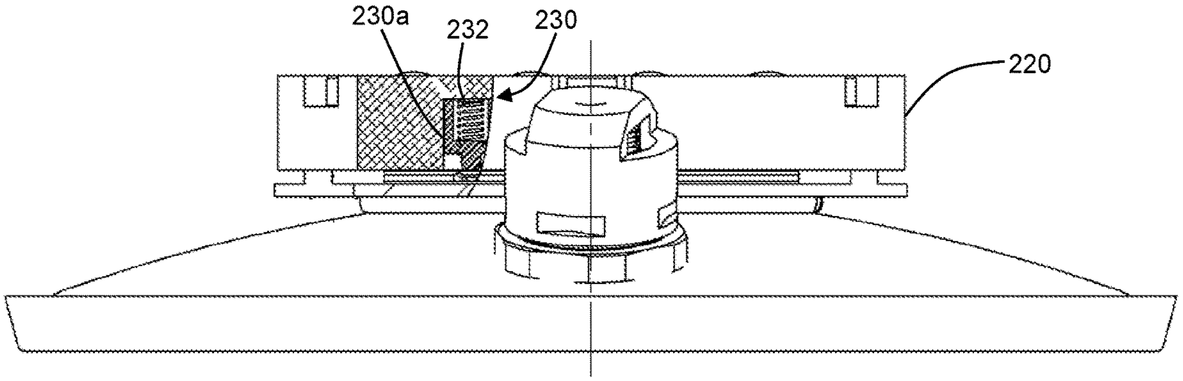
FIG. 4 is a side view of the device of FIGS. 2, 3A, and 3B, wherein a partial cross-section is shown in detail.
Figure 5A:
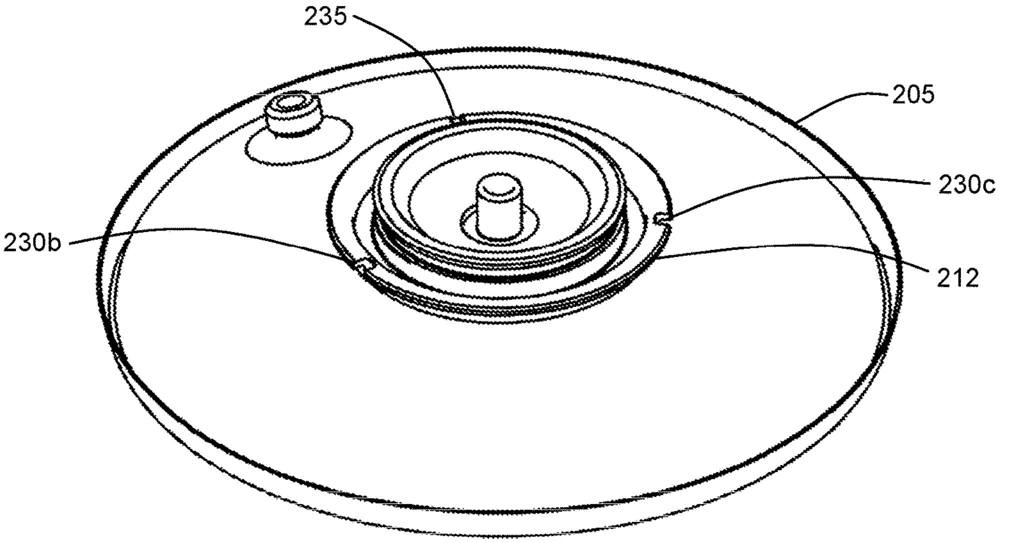
FIG. 5A is a perspective view of a portion of the device of FIGS. 2, 3A, 3B, and 4, wherein the plenum body is not shown.
Figure 5B:
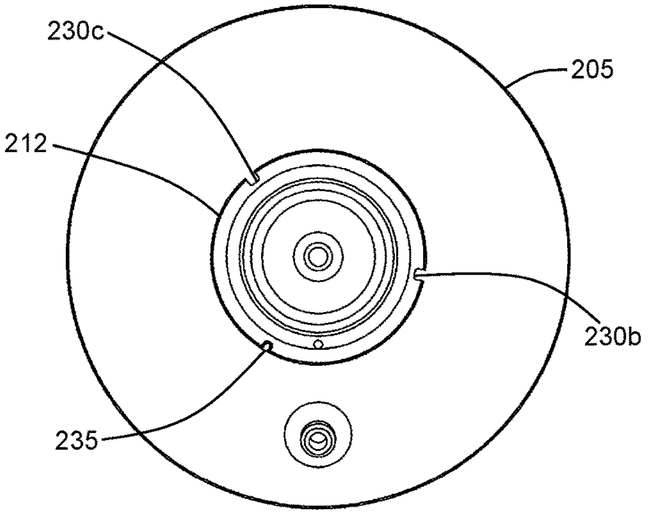
FIG. 5B is a top view of the device portion of FIG. 5A.
Figure 5C:
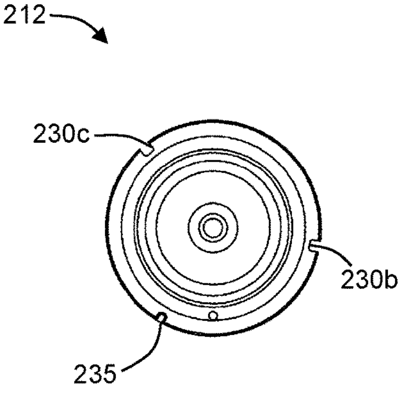
FIG. 5C is a top view of the locator plate of FIGS. 5A and 5B.

FIG. 4 is a detail view showing a lock 230 for immobilizing the plenum body 220 with respect to the locating plate 212 in at least a first position. The lock 230 may be or may include a pin 230*a*. The pin 230*a* may be located in the plenum body 220 and configured to cooperate with the locating plate 212 to immobilize the plenum body 220 with respect to the locating plate 212. For example, the pin 230*a* may cooperate with a receiver of the locating plate. The receiver may be a notch, hole, indentation, a slot, or other feature or features of the locating plate. FIGS. 5A-5C depict a locating plate 212 having a notch 230*b* which cooperates with pin 230*a*. The lock 230 may include a spring 232 such that the pin 230*a* is spring-biased to remain in a locked position once locked. The lock 230 may be configured to irreversibly immobilize the plenum body 220 with respect to the locating plate 212. The lock 230 may be configured to immobilize the plenum body 220 in at least one additional position relative to the locating plate (see second notch 230*c* in FIGS. 5A-5C). In this way, for example, a COG may be configured for installation in a left side of an aircraft or a right side of an aircraft. In some embodiments, the lock may be configured to reversibly immobilize the plenum body in a shipping position relative to the locating plate. For example, the locating plate 212 depicted in FIGS. 5A-5C includes a shipping indent 235 to partially engage the pin 230*a*. In this way, the shipping position is intended to hold the manifold in a neutral position during shipment. Upon installation, the manifold can be rotated (for example, rotated by hand) from the shipping position to the final, locked position according to the container configuration.

Figure 6A:
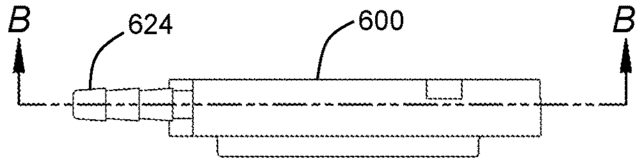
FIG. 6A is a side view of an exemplary plenum body according to an embodiment of the present disclosure.
Figure 6B:
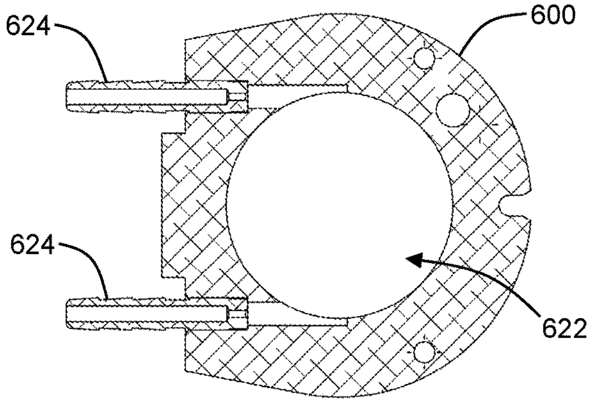
FIG. 6B is a cross-sectional top view of the plenum body of FIG. 6A, taken along B-B of the FIG. 6A.
Figure 7A:
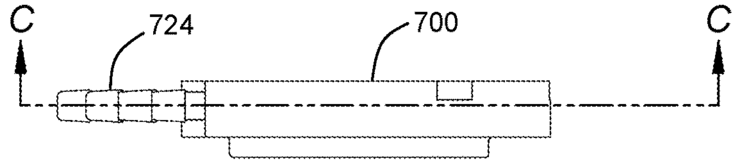
FIG. 7A is a side view of another exemplary plenum body according to an embodiment of the present disclosure.
Figure 7B:
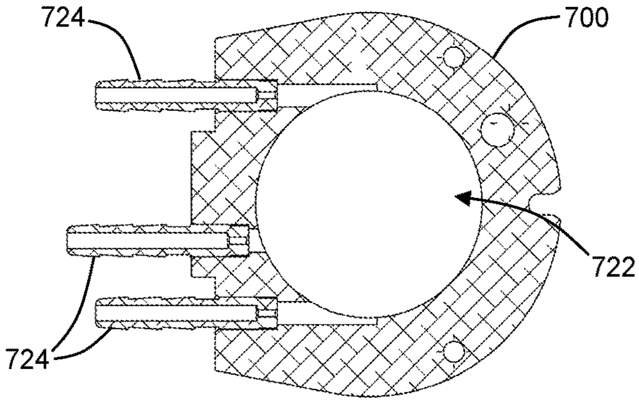
FIG. 7B is a cross-sectional top view of the plenum body of FIG. 7A, taken along C-C of the FIG. 7A.

FIGS. 6A and 6B show an exemplary plenum body 600 according to an embodiment of the present disclosure. The plenum body 600 includes two output ports 624. In the present embodiment, the output ports 624 are "barbed" for more secure attachment of hoses/tubes. The plenum body 600 also includes an inlet 622. FIGS. 7A and 7B show an exemplary plenum body 700 according to an embodiment of the present disclosure. The plenum body 700 includes three output ports 724. In the present embodiment, the output ports 724 are "barbed" for more secure attachment of hoses/tubes. The plenum body 700 also includes an inlet 722.

Figure 8:
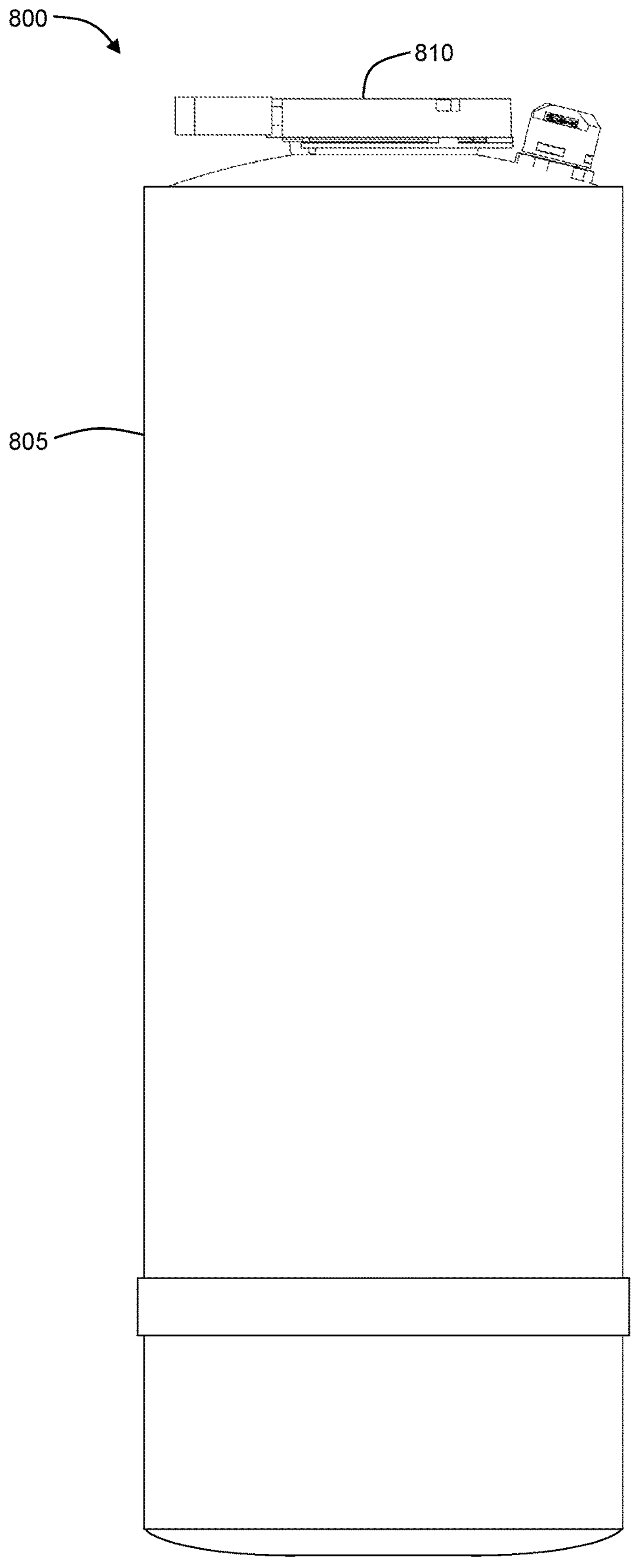
FIG. 8 is a chemical oxygen generator (COG) according to another embodiment of the present disclosure.

With reference to FIG. 8, the present disclosure may be embodied as a chemical oxygen generator (COG) 800. The COG 800 may comprise a housing 805 and a manifold 810 according to any of the embodiments discloses herein. In an example, a COG has a housing and a locating plate attached to the housing. A plenum body is rotatably attached to the locating plate. The plenum body has an inlet for receiving oxygen from an interior of the housing. The plenum body also includes at least one output port in pneumatic communication with the inlet. The manifold of the COG includes a lock for immobilizing the plenum body with respect to the locating plate (and with respect to the housing) in at least a first position.

An objective of the present disclosure is to allow locating and locking a manifold in a desired position at the point of installation in an aircraft given a right or left aisle location. By design, in some embodiments, the locking device is not easily tampered with by standard means or typical tooling.

As received by a customer, the chemical oxygen generator manifold may be in a neutral, unlocked position. At the time of installation, the manifold orientation will be selectable by rotating the manifold on a chemical oxygen generator outlet mounting stud. When the manifold is located in the desired position it is locked in place by, for example, the engagement of a spring loaded pin, which mechanically fixes the manifold to the mounting stud. This may secure the location (orientation) of the manifold for the life of the unit.

This addresses and resolves the issue of locking the chemical oxygen generator manifold in a set position in order to accommodate a right or left isle installation in an aircraft. It also allows the manifold to be located and locked into position at the time of installation. This allows shipment of only one part number, instead of multiple part numbers, to cover either a left or right hand installation. Advantages over other designs include flexibility to accommodate right and left isle installation with one part number configuration, no specialty tools are necessary to lock the manifold in place, and adaptable to current low profile manifold design.

When installed, it may be desirable to position and lock the manifold to face the open cabin side of an activated Passenger Service Unit (PSU). In this way, there is a reduced risk of oxygen flowing into a confined space creating a hazardous, oxygen-enriched area. Using embodiments of the present disclosure allows for one manifold to be locked in multiple locations during installation in a smaller envelope compared to past designs and concepts. Previous designs were not user adjustable for manifold location. The manifold either rotated freely or was fixed in one predetermined position. As a result, due to this previous design, multiple configurations were required, and included corresponding part numbers for left and right aircraft installations locations.

Although the present disclosure has been described with respect to one or more particular embodiments, it will be understood that other embodiments of the present disclosure may be made without departing from the spirit and scope of the present disclosure.

I claim:

1. A chemical oxygen generator (COG) comprising a manifold, the manifold comprising:

a locating plate configured to interface with a COG;

a plenum body rotatably attached to the locating plate, the plenum body having an inlet for receiving oxygen, the plenum body further having at least one output port in pneumatic communication with the inlet; and a lock non-removably engaged to the plenum body configured to immobilize the plenum body with respect to the locating plate in at least a first position and at least one additional position relative to the locating plate.

2. The COG of claim 1, wherein the lock comprises a pin, a latch, a tab, a stud, or a clip.

3. The COG of claim 1, wherein the lock comprises a pin located in the plenum body and configured to cooperate with the locating plate to immobilize the plenum body with respect to the locating plate.

4. The COG of claim 3, wherein the pin is configured to cooperate with a receiver of the locating plate.

5. The COG of claim 4, wherein the receiver is a notch, a hole, a slot, or an indentation.

6. The COG of claim 1, wherein the lock is configured to irreversibly immobilize the plenum body with respect to the locating plate.

7. The COG of claim 1, wherein the first position and the at least one additional position are configured such that the COG may be alternatively installed on a left or right side of an airplane cabin.

8. The COG of claim 1, wherein the lock is configured to reversibly immobilize the plenum body in a shipping position relative to the locating plate.

9. The COG of claim 1, wherein the plenum body comprises two or more output ports in pneumatic communication with the inlet.

10. The COG of claim 1, wherein the locating plate is fixed relative to the COG.

11. The COG of claim 1, further comprising:

a housing, wherein the locating plate is attached to the housing, and wherein the inlet of the plenum body is configured to receive oxygen from an interior of the housing.

12. The COG of claim 11, wherein the lock comprises a pin, a latch, a tab, a stud, or a clip.

13. The COG of claim 11, wherein the lock comprises a pin located in the plenum body and configured to cooperate with the locating plate to immobilize the plenum body with respect to the locating plate.

14. The COG of claim 13, wherein the pin is configured to cooperate with a receiver of the locating plate.

15. The COG of claim 14, wherein the receiver is a notch, a hole, a slot, or an indentation.

16. The COG of claim 11, wherein the lock is configured to irreversibly immobilize the plenum body with respect to the locating plate.

17. The COG of claim 11, wherein the lock is configured to reversibly immobilize the plenum body in a shipping position relative to the locating plate.

18. The COG of claim 11, wherein the plenum body comprises two or more output ports in pneumatic communication with the inlet.

19. The COG of claim 1, wherein the first position and the at least one additional position are configured such that the COG may be alternatively installed on a left or right side of an airplane cabin.

* * * * *